United States Patent
Black et al.

(10) Patent No.: US 9,110,259 B1
(45) Date of Patent: Aug. 18, 2015

(54) INTERLEAVED ALIASED AWG FILTER FOR CONTINUOUS WIDEBAND WAVELENGTH DISCRIMINATION

(71) Applicants: Richard J. Black, Menlo Park, CA (US); Joannes M. Costa, Rancho La Costa, CA (US); Behzad Moslehi, Los Altos, CA (US); Vahid Sotoudeh, Los Altos, CA (US); Jay A. Chesavage, Palo Alto, CA (US)

(72) Inventors: Richard J. Black, Menlo Park, CA (US); Joannes M. Costa, Rancho La Costa, CA (US); Behzad Moslehi, Los Altos, CA (US); Vahid Sotoudeh, Los Altos, CA (US); Jay A. Chesavage, Palo Alto, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 0 days.

(21) Appl. No.: 14/616,488

(22) Filed: Feb. 6, 2015

Related U.S. Application Data (63) Continuation-in-part of application No. 13/830,939, filed on Mar. 14, 2013, now Pat. No. 8,983,250.

(51) Int. Cl.
| | |
|---|---|
| *G02B 6/28* | (2006.01) |
| *G02B 6/34* | (2006.01) |
| *G02B 6/42* | (2006.01) |
| *G02B 6/293* | (2006.01) |
| *G02B 6/12* | (2006.01) |
| *G02B 6/02* | (2006.01) |
| *G02B 6/124* | (2006.01) |

(52) U.S. Cl.
CPC ............ *G02B 6/4215* (2013.01); *G02B 6/2938* (2013.01); *G02B 6/29304* (2013.01); *G02B 6/34* (2013.01); *G02B 6/4298* (2013.01); *G02B 6/022* (2013.01); *G02B 6/02085* (2013.01); *G02B 6/02138* (2013.01); *G02B 6/124* (2013.01); *G02B 6/12007* (2013.01); *G02B 6/29383* (2013.01); *G02B 6/29395* (2013.01)

(58) Field of Classification Search
CPC ............ G02B 6/2938; G02B 6/29395; G02B 6/29383; G02B 6/124; G02B 6/02085; G02B 6/12007; G02B 6/02138; G02B 6/022
USPC ...................................... 385/24, 37
See application file for complete search history.

(56) References Cited

U.S. PATENT DOCUMENTS 7,903,907 B1 * 3/2011 Park et al. ................. 385/12

* cited by examiner

*Primary Examiner* — Jerry Blevins
(74) *Attorney, Agent, or Firm* — File-Ee-Patents.com; Jay A. Chesavage

(57) ABSTRACT

A plurality of AWG filters with aliasing responses are selected such that the wavelength range of a fundamental response of the AWG filters results in the aliased range of AWG filters to be adjacent to a fundamental range of the AWG filters. A plurality of optical sources is provided sufficient to cover each fundamental wavelength range and each alias wavelength range of the AWG filters. When a single one of the optical sources is enabled, reflected optical energy from a series string of FBGs coupled to the optical source is applied to the plurality of AWG filters, and the AWG output in combination with the wavelength range of the optical source is used to discriminate reflected wavelength from the FBG sensors.

23 Claims, 10 Drawing Sheets

Figure 12
2-WAY ALIASING AWG INTERROGATOR W/CWDM

INTERLEAVED ALIASED AWG FILTER FOR CONTINUOUS WIDEBAND WAVELENGTH DISCRIMINATION

The present invention is a continuation-in-part of application Ser. No. 13/830,939 filed Mar. 14, 2013, now issued as U.S. Pat. No. 8,983,250.

FIELD OF THE INVENTION

The present invention relates to arrayed waveguide (AWG) filters for resolution of a wavelength presented to a wavelength discriminator. In particular, the present invention relates to the use of AWG filters with aliasing responses for use in discrimination of wavelengths at aliasing responses of the AWG filter.

BACKGROUND OF THE INVENTION

A wavelength interrogator typically uses a sine filter or other type of wavelength sensitive filter which has a monotonic response to a shift in incoming wavelength, with the wavelength interrogator coupled to a fiber Bragg grating (FBG) sensor, which may be place in series with other FBG sensors, each sensor having a corresponding wavelength discriminator. A limit is reached in such an architecture, where the number of sensors is limited by the number of sine filters in the interrogator.

Additionally, the sine filters are individual components, each of which is tuned to operate in a particular range of wavelengths. It is desired to provide a wavelength interrogator architecture where the number of sensors which may be deployed is not limited by the number of discrete sine filters or other filters which resolve wavelength into detector response in the interrogator.

OBJECTS OF THE INVENTION

A first object of the invention is an optical interrogator which uses an arrayed waveguide grating to perform wavelength discrimination.

A second object of the invention is a wavelength interrogator having a broadband source coupled to a circulator, the circulator transferring optical energy from the broadband source to a sensing optical fiber having a plurality of fiber gratings for sensing, each fiber grating operating in a unique wavelength range, reflected optical energy from the fiber gratings reflected back to the circulator, the circulator directing the energy to an AWG input port, each fiber grating returning optical energy in a skirt response region of a unique channel of the AWG, a unique channel of the AWG coupled to a detector, the adjacent detector responses of each AWG channel used to determine the response wavelength of an associated fiber sensor.

A third object of the invention is a wavelength interrogator having a plurality of broadband sources, each broadband source operative in a particular and unique wavelength range associated with a particular sensor string, the broadband sources coupled to a circulator which couples the optical energy from the broadband sources to a plurality of fiber sensor strings, each fiber sensor string having a plurality of fiber Bragg gratings responsive to wavelengths of one of the broadband sources, each fiber sensor string grating also generating a unique wavelength reflection for each sensor, the optical energy from the sensors returned through the circulator to an AWG having a plurality of channels, each channel coupled to a detector, the detectors of adjacent channels of the AWG used to determine the wavelength of a particular sensor in each particular broadband source response range.

A fourth object of the invention is an aliasing AWG interrogator which utilizes a first AWG filter with a response in a first wavelength range which is adjacent to the wavelength range of a second AWG filter, where the lowest wavelength of the first AWG aliases to a wavelength greater than the highest wavelength of the second AWG filter.

A fifth object of the invention is an aliasing AWG interrogator which utilizes a first AWG filter with a response in a first wavelength range and a second AWG filter with a response in a second wavelength range, the first AWG filter wavelength range adjacent to the second AWG filter wavelength range, where the lowest wavelength of the first AWG range also aliases to a wavelength adjacent to the highest wavelength of the second AWG filter, the aliasing AWG interrogator thereby able to discriminate wavelength when coupled to a string of fiber Bragg gratings (FBGs), each FBG responsive in a unique range of wavelengths corresponding to a fundamental response range of two adjacent AWG filters or the alias response of the two adjacent AWG filters, the string of FBGs excited by an optical source having a bandwidth equal or less than the sum of the first AWG filter wavelength range and second AWG filter wavelength range.

SUMMARY OF THE INVENTION

An optical fiber with a plurality of sequential gratings is coupled to a circulator or directional coupler, such that the circulator or directional coupler receives broadband optical energy from the broadband source and couples the broadband optical energy to an optical fiber with the plurality of gratings operative as sensors having gratings. Reflected energy from the plurality of sequential gratings is directed through the circulator to the input of an array waveguide grating (AWG), which segregates each wavelength to a particular AWG output channel. The AWG grating responses and AWG response skirts are selected such that the grating response occurs in an AWG response skirt, and each channel of the AWG is coupled to an associated detector. Detectors for adjacent channels are measured for a response, and the combined response of two adjacent channels is used to determine the reflected wavelength for a particular sensor to perform wavelength interrogation which converts the measured detector output to the corresponding wavelength.

If sensor strings formed from sequential fiber Bragg gratings are placed in series, each sensor string responsive to one of a plurality of selectable sources, and each sensor of each string is operative in a unique wavelength range and used with an AWG which generates a wavelength aliasing (repeating) response, then a single AWG can be used, with each sensor string receiving excitation from a separate broadband source operative in the wavelength range of that particular sensor string. The present invention thereby provides simultaneous interrogation of a plurality n/2 of sensors using adjacent AWG channel detector responses in an AWG having n channels.

DETAILED DESCRIPTION OF THE INVENTION

AWG filters are widely used in telecommunications to provide unique wavelength response in a WDM (wavelength division multiplexing) system which assigns adjacent wavelengths to independent communication sessions, and the AWG filter is utilized because it has multiple adjacent filtered channels, each with a flat response in a filtering range, and a skirt response region adjacent to, and on either side of, the flat response region.

Figure 1:
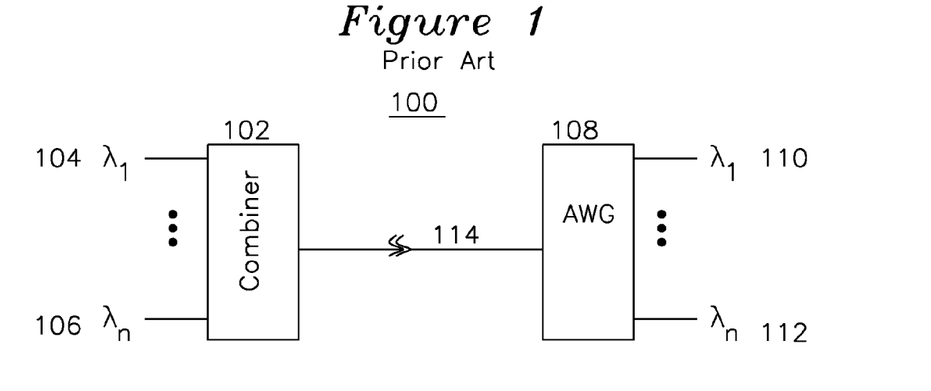
FIG. 1 is a block diagram of two AWG filters used in a communication link.

FIG. 1 shows a prior art AWG communication system. Individually modulated laser sources 104 at λ1 through 106 at λn modulate optical energy in distinct and non-overlapping wavelengths, such as an ITU wavelength grid. The wavelengths to be transmitted over a single fiber may be summed using a combiner 102, or an AWG for coupling the multiple sources at unique wavelengths to a single optical fiber 114 which carries the combined wavelength channel information to a remote station with AWG 108 for demultiplexing the wavelengths into individual wavelengths and channels 110 λ1 through 112 λn, each receive channel λ1 110 to λn 112 corresponding to the transmission channels λ1 104 through λn 108.

Figure 2:
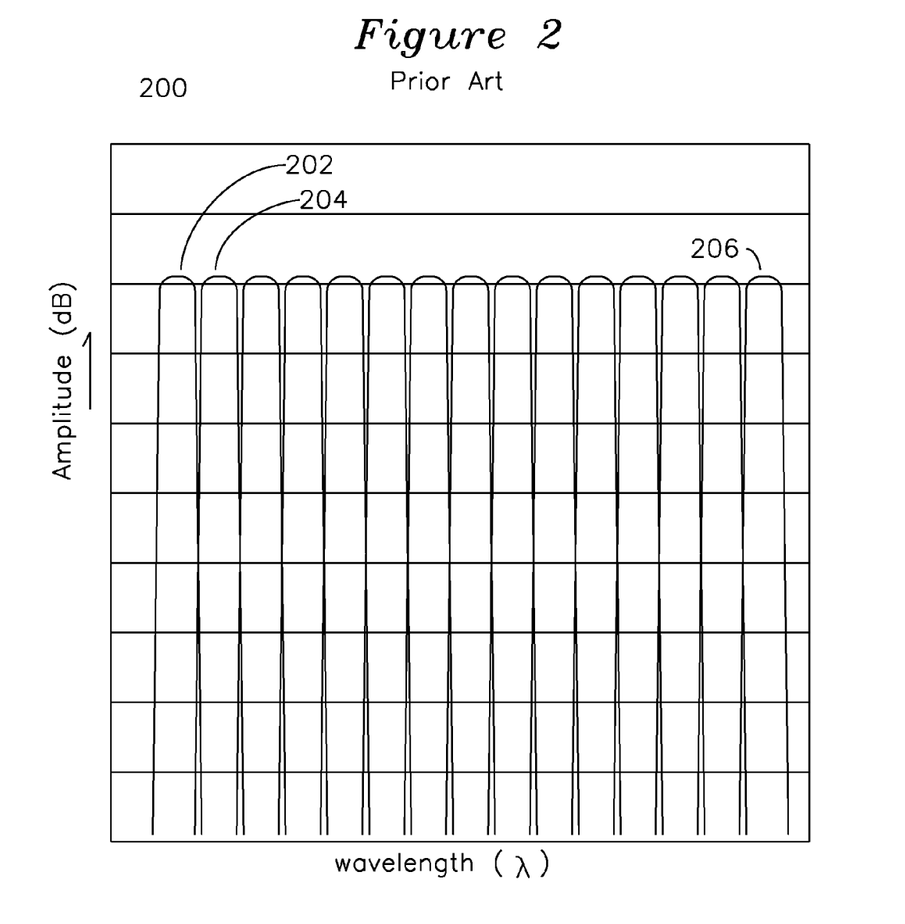
FIG. 2 is a plot of the wavelength response of the filter of FIG. 1.

FIG. 2 shows the wavelength response for the individual channels of the AWG filter. Channel 202 may correspond to λ1 104, channel 204 may correspond to λ2 204, and channel 206 may correspond to λn, with the maximum number of channels n equal to the number of channels of the AWG 108.

Figure 3:
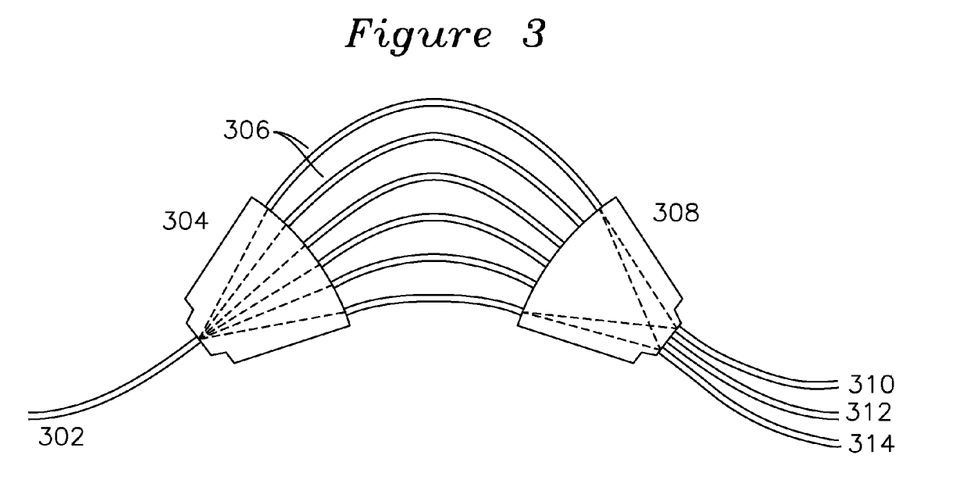
FIG. 3 is a schematic view of an AWG filter.

FIG. 3 shows a schematic view of a typical AWG. An optical fiber 302 carrying a plurality of wavelength channels of information is coupled to a star coupler 304, which directs the optical energy through an array of paths 306, each of which is slightly longer than an adjacent path, having a prism effect of spatially separating optical energy according to wavelength at the star coupler 308, which combines the optical energy with longer wavelengths directed to fiber 310 and optical energy having shorter wavelengths to fiber 314, and expandable to any number of fibers, although only three are shown for clarity. In practice, the AWG is fabricated using couplers 304, 308, and delay path array 306 on an integrated optical substrate, or is integrated with other system optical components on a single substrate, and FIG. 3 is provided only for illustration in understanding the operation of the AWG.

Figure 4:
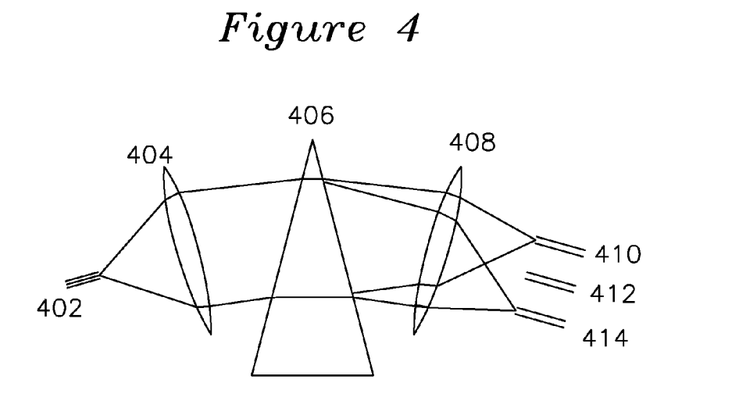
FIG. 4 is a diffraction optics equivalent to the AWG filter of FIG. 3.

FIG. 4 shows an optical analogy using lenses 404 and 408 and prism 408 which performs the path delay, separating the optical energy in input fiber 402 (analogous to input fiber 302 of FIG. 3) according to wavelength to output fibers 410, 412, 414, which are analogous to output fibers 310, 312, 314 of FIG. 3.

The AWG has optical properties which are useful for dense wavelength division multiplexing (DWDM) communications in adjacent channels, specifically a flat passband for wavelengths near the center response wavelength, and a drop cut-off skirt adjacent to the flat passband region. Because of their wide use in telecommunications systems which require a large number of channels on adjacent wavelengths, AWGs can be economical devices on a per-channel basis.

Figure 5:
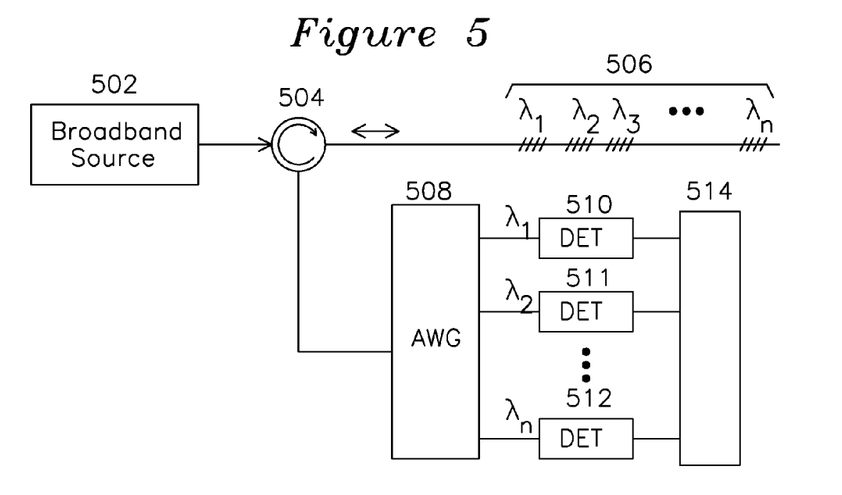
FIG. 5 is a wavelength interrogator for use with a plurality of gratings located on a single optical fiber.

FIG. 5 shows a wavelength interrogator according to one embodiment of the present invention. Broadband source 502 is coupled to a circulator 504 which transmits broadband optical energy to a sequential series of gratings 506 which are formed on an optical fiber. Each sequential FBG of sensor string 506 reflects energy at a particular wavelength back to circulator 504, and this reflected optical energy is directed by the circulator 504 to AWG filter 508 input, which segregates the optical energy from each channel into an individual output detector 510 through 512, and to wavelength detector 514 which compares detector responses to determine the wavelength based on detector response of each adjacent AWG detector pair. Each detector may be an amplitude sensing broadband response photodiode or phototransistor, or avalanche photodetector, or any optical detector which translates an optical input into an electrical response, such as may be converted using an A/D converter for use in a look-up table or other numeric processing. The sensor gratings 506 may be fiber Bragg gratings, Fabry-Perot gratings, or any other type of sensor which generates a change in reflected wavelength in response to a physical parameter change according to the sensor type, including but not limited to strain, temperature, or pressure.

Figure 6:
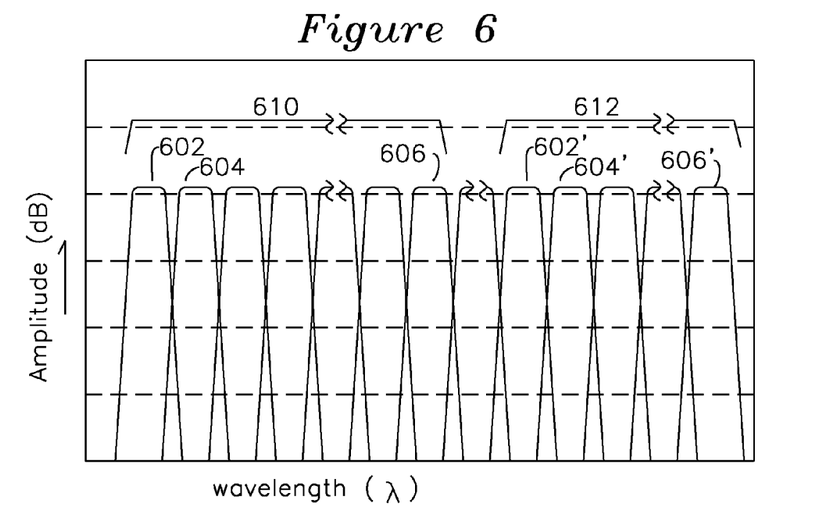
FIG. 6 is a wavelength discrimination plot for the interrogator of FIG. 5 and FIG. 9.

FIG. 6 shows the output response for the AWG filter, where λ1 detector 510 output may contain only the response of channel 602 shown in FIG. 6, and λ2 detector 511 output may contain only the response of channel 604, and so on through detector 512 response for λn of AWG channel 606. In one embodiment of the present invention, the FBG sensor responses fall in the skirt areas of the AWG response, rather than the passband where the filter is typically used, and the detector responses from adjacent skirt responses are used to discriminate the wavelength of applied wavelength. In this manner, n channels of AWG filter may be used in pairs to simultaneously interrogate n/2 FBG sensors.

Figure 7:
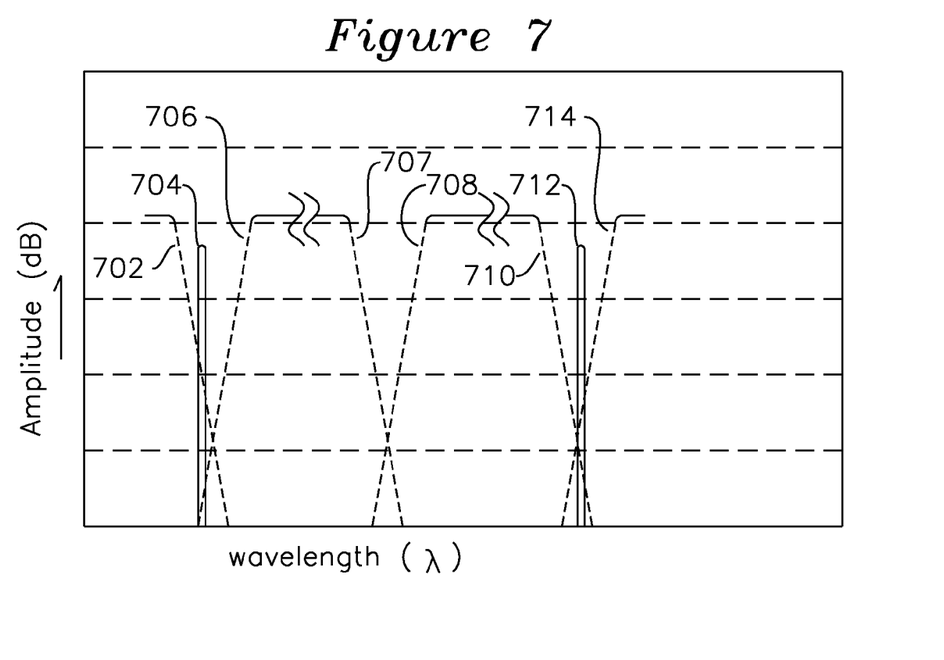
FIG. 7 is an AWG response plot for adjacent channels.

FIG. 7 shows a response such as from optical energy 704 reflected from a first FBG of sensor string 506 at λ1 and optical energy 712 reflected from a second FBG of sensor string 506 from λ2. 702 shows a skirt from one of the AWG channels and 706 is the skirt from an adjacent AWG channel which is part of an AWG channel response which extends to skirt 707 of the same AWG channel, with skirt 708 and 710 belonging to the next adjacent channel of the AWG. Each AWG channel has an associated detector 510, 511 through 512 as shown in FIG. 5, and the sensor grating wavelengths are selected such that optical energy is reflected back to the AWG falling between the two channels. By using the skirt responses of adjacent channels and with the FBG response in the skirt region of two adjacent channels, it is possible to determine the wavelength reflected by the FBG by examining the ratio of responses from the skirt responses of two adjacent channels. For example, reflected energy 704 from a sensor is measured by the response it generates in the detector coupled to the detector associated with the AWG channel having skirt 702 and the response in the detector coupled to the AWG channel having skirt 706. As the skirt 706 is also responsive to optical energy in skirt 707 for the same channel, the FBG sensors are selected such that optical energy reflected by a particular sensor is only present in one channel of the AWG at a time.

Figure 8:
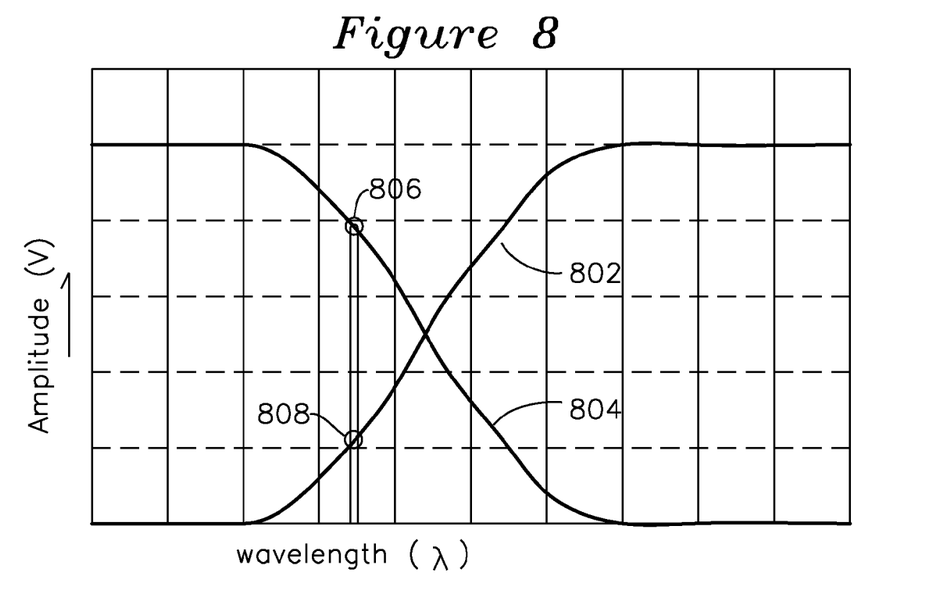
FIG. 8 is a plot of adjacent channel detector responses.

FIG. 8 shows another view of the reflected optical energy 704 of FIG. 7. In this example, detector response 806 corresponds to the lower channel 804 skirt (702 of FIG. 7) and detector response 808 corresponds to the upper channel 802 (706 of FIG. 7). By providing a mapping between relative channel response strength such as by using a look-up table of ratiometric responses, or by scaling the ratio of one detector to another based on a calibration, or by any other method for converting two detector responses into a wavelength response from previously characterized response of the AWG, it is possible to perform wavelength interrogation use the AWG with a detector on each adjacent AWG channel operating in the skirt region where one detector output is increasing while another is decreasing with change in detected wavelength, and with each sensor grating responding to a unique channel such that each channel has no more than one response from a sensor FBG generating a detector response.

Figure 9:
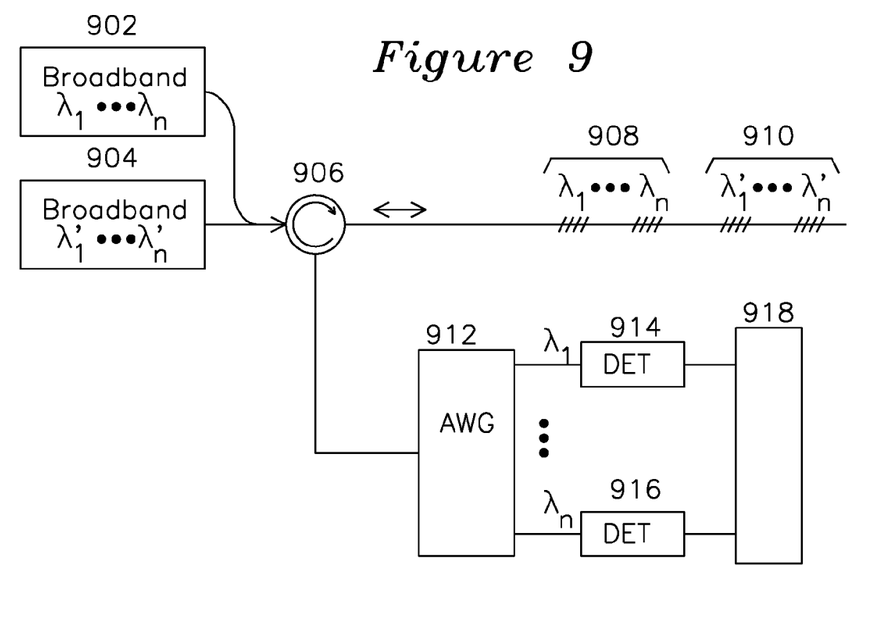
FIG. 9 is a block diagram for an interrogator using a single AWG with an aliasing response, and interrogating a plurality of sensor strings, each string operative in its own wavelength band, but using the same AWG for wavelength discrimination.

In another embodiment of the invention shown in FIG. 9, the repeating (aliasing) wavelength response of the AWG filter to wavelengths which are out of the design band is used for wavelength discrimination. FIG. 6 shows the repeating AWG response pattern with a first response excitation band 610, followed by a second (aliasing) response band 612. By choosing FBG sensor wavelengths of the sensor string in a first group which corresponds with excitation band 610, and placing in series with the first sensor string a second string of sensors in a second group which corresponds with excitation band 612, it is possible to provide an excitation source which exclusively excites the first string sensors in a first interval, followed by an excitation source which exclusively excites the second string sensors in a second interval, but read by the AWG as if they were in the first interval by using the AWG wavelength aliasing behavior. By commutating the sources 902 and 904, and using the same AWG filter, it is possible to discriminate an unlimited number of sensors using the same AWG adjacent channels, by relying on the selectivity offered by the source spectrum in combination with the aliasing response of the AWG sensor.

Accordingly, in one embodiment of the invention, the repeating response pattern of the AWG filter over regular wavelength intervals which exceed the range of wavelengths encompassed by the channels $\lambda 1$ through $\lambda n$ is used to extend the use of the AWG filter to the aliased wavelengths. It is therefore possible to utilize a source which excites a first range of wavelengths $\lambda 1$ through $\lambda n$, and a second source which excites $\lambda 1'$ through $\lambda n'$, where the same AWG first channel is responsive to both $\lambda 1$ and $\lambda 1'$ due to AWG aliasing, and the second AWG channel is responsive to both $\lambda 2$ and $\lambda 2'$, etc, even though the wavelengths of the other FBGs $\lambda 1'$ through $\lambda n'$ are greatly separated from the original $\lambda 1$ to $\lambda n$. In this manner, a first string of FBG sensors 908 responsive to $\lambda 1$ to $\lambda n$ may be placed in front of a second string of FBG sensors $\lambda 1'$ through $\lambda n'$, expanded to any number of FBG sensor strings or sensors per string, subject to the constraint that the AWG first channel be responsive to both $\lambda 1$ and $\lambda 1'$, second channel responsive to $\lambda 2$ and $\lambda 2'$, etc. In operation, source 902 is enabled, for example corresponding to range 610 of FIG. 6, which generates responses from FBG sensors of sensor string 908 read by AWG as previously described. Subsequently, source 904 is enabled, for example corresponding to range 612 of FIG. 6, which generates responses from FBG sensors of sensor string 910, which are directed to the same AWG 912 and read by the same detectors 914 through 916, and resolved as differential adjacent channel responses as was described for FIGS. 7 and 8, and the adjacent channel responses are resolved to wavelengths by wavelength resolver 918, which may use a formulaic relationship between wavelength and adjacent detector response, or it may use a look-up table, or any other method for discriminating wavelength from a known skirt characteristic. The invention thereby provides providing a high level of channel reuse for a fixed number of AWG channels.

FIG. 9A shows an alternative source generation for a four-band system, using an O optical band (1260-1360 nm) source 950, E optical band (1360-1460 nm) source 952, S optical band (1460-1530 nm) source 954, C optical band (1530-1570 nm) source 956, L optical band (1565-1625 nm) source 958, and U optical band (1625-1675 nm) source 960. Each source can either be electrically enabled 948 in sequence, such as at a 1 Mhz rate, with each source enabled for 1 uS at a time, or any rate or in any order, as the associated sensor string will respond instantaneously, and the AWG channel will respond accordingly, with the wavelength resolver 918 utilizing the enabled source to determine which grating to associate the aliased (associated channel on a particular sensor string) AWG response. Using all of the 6 optical bands in succession, it is possible to provide a 6-way interleave of the sensors, where there are 6 sensor strings, each sensor string responsive to a particular band, and with a the adjacent AWG detector responses used in combination with enabled band information from the wavelength resolver 918. In one embodiment, the band controller 948 enables each band (or subset of bands) in succession by switching a power source for the source on at a high rate of speed, or alternatively, the source may be controllable using an optical beam switch such as a liquid crystal, silicon photonic crystal, MEMS shutter, mechanical shutter, or any method known in the art of electronic or mechanical laser switching.

Figure 10:
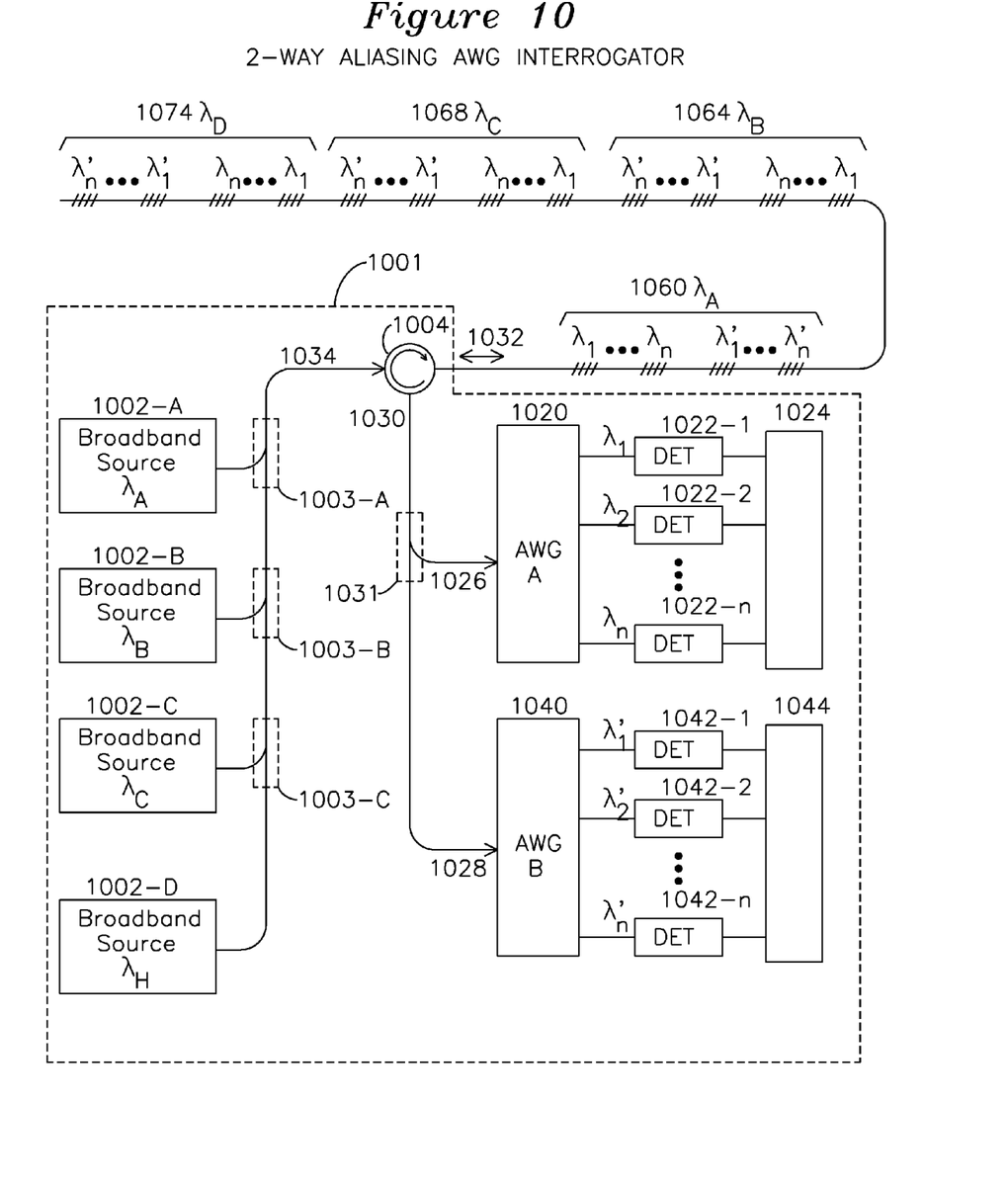
FIG. 10 is a block diagram for a 2-way AWG filter used in a wavelength interrogator.

FIG. 10 shows the block diagram for an example 2-way aliasing AWG interrogator. First AWG 1020 and second AWG 1040 each receive optical energy from inputs 1026 and 1028, respectively, and each AWG covers a wavelength range, directing optical energy within a particular wavelength range to a plurality of outputs $\lambda 1$ to $\lambda n$ for AWG 1020 and $\lambda 1'$ to $\lambda n'$ for AWG 1040. Each AWG filter has a plurality of channel outputs, each responsive to a narrow range of wavelengths, with the corresponding wavelength for a particular narrow wavelength range directed to an optical detector, where n is the number of outputs of a particular AWG. The first AWG 1020 and second AWG 1040 are shown as having the same number of outputs for simplicity, but this is not required for operation of the invention.

A subtle characteristic of an AWG filter is that it has an aliasing response, canonically repeating its fundamental response at shorter wavelengths. This is ordinarily considered an undesirable characteristic in optical communication system design, however by placing two or more AWG filters in adjacent wavelength ranges, and through careful selection of AWG device parameters with use of the aliasing response characteristic, it is possible for the AWG to provide wavelength selectivity over a wide range of input wavelengths, as the pair of AWG filters can be selected to alias adjacent ranges, thereby continuously covering the entire desired wavelength range.

In one example of the invention, a first AWG and second AWG have a fundamental first wavelength range and fundamental second wavelength range, respectively, and the first and second AWG filters are selected to have these response wavelength ranges adjacent to each other. The aliasing wavelength is further selected to be the equal to or greater than the sum of the first AWG filter wavelength range and second AWG filter wavelength range. In this manner, the AWG filter aliasing provides a canonical aliased response which provide continuous coverage of a wide range of wavelengths to resolve. The channel outputs of each AWG are coupled to optical detectors which indicate the optical amplitude or intensity present at each pair of outputs by using the skirts of the channel response and utilizing the skirts of two adjacent channels for optimum change in detector response for change in wavelength. The wavelength is preferably resolved using pairs of adjacent AWG channel detectors, although the wavelength may also be resolved using a single AWG filter channel and associated detector in a narrower range of FBG wavelengths. Since the AWGs have an aliasing response, resolution to a particular AWG fundamental or aliased range is accomplished by using an optical source which is broadband in wavelength, but only covers the combined responses of the fundamental AWG filter wavelength range of the AWG pair, or the wavelength range of the aliased AWG filter pair. In one example of the invention, a plurality of FBGs are placed in series, with the series collection of FBGs reflecting optical energy which spans the wavelength range of many such fundamental and aliased AWG responses and with subset of FBGs operative in a fundamental or aliased AWG response wavelength, also corresponding to the wavelength range of an associated broadband source. In this example, the string of FBGs are optically energized with optical energy within the combined fundamental or aliased AWG filters and the shift in wavelength from the FBG is measured at a single AWG output (or pair of AWG outputs) and converted into a strain or temperature, as is known in the art.

FIG. 10 shows one such example interrogator, where a circulator 1004 has an optical source input port 1034 which is coupled to a plurality of optical sources 1002-A, 1002-B, 1002-C, and 1002-D, each of which is operative in a wavelength range or wavelength alias range of the pair of AWGs 1020 and 1040, with each optical source 1002-A, 1002-B, 1002-C, and 1002-D coupling optical energy through associated optical combiners 1003-A, 1003-B, and 1003-C to form a single multi-band optical source 1034 coupled to circulator 1004 optical source port. Alternatively, to reduce losses associated with optical combiner/splitter components, combiners 1003-A, 1003-B, 1003-C may be formed from CWDM filters, which have a narrowband add port corresponding to the particular optical source wavelength range, the narrowband add port coupled to each optical source, and a broadband through-port coupled to the previous CWDM filter output. In this manner, the optical losses from each broadband source to the circulator are reduced. Optical energy provided to circulator 1004 source port is directed to the circulator sensor port, which is coupled to FBG sensors 1060, 1064, 1068, and 1074, each of which are operative in a wavelength range associated with one of the optical sources 1002-A through 1002-D, only one of which optical sources is typically enabled at a particular moment in time. Reflected optical energy from gratings operative in the enabled source optical wavelength range is directed through circulator 1004, and thereafter to first AWG 1020 and second AWG 1040 through optical splitter 1031. Each AWG output (indicated $\lambda 1$ through $\lambda n$ for first AWG 1020 and $\lambda 1'$ through $\lambda n'$ for second AWG 1040) is coupled to an associated optical to electrical converter, indicated as detectors 1022-1 through 1022-n for the first AWG 1020 and 1042-1 through 1042-n for the second AWG 1040. As was indicated earlier, for simplicity, the first AWG 1020 and second AWG 1040 are shown with the same number of optical outputs, although this is not required. Optical energy from an enabled one of the sources 1002-A through 1002-D enters circulator optical source port 1034, is directed to the optical circulator sensor port 1032 and on to the string 1006 of optical FBGs responsive to $\lambda 1$ to $\lambda n$ and $\lambda 1'$ to $\lambda n'$, and a particular one or more of the FBGs 1006 will reflect narrowband optical energy back to circulator 1004, which directs the narrowband optical energy from the various responding sensors back to a corresponding first AWG 1020 and second AWG 1040 for resolution to a particular wavelength. By confining each FBG to operate in the adjacent skirts of two adjacent AWG response outputs, a pair of AWG outputs can be used to resolve the wavelength of a single FBG. In the case of a first and second AWG each having 40 outputs, and with the outputs read in pairs to resolve a single FBG, 39 such FBG sensors can be simultaneously resolved for wavelength by a particular source. In the present example where 4 broadband optical sources are used as shown in FIG. 10, each optical source covering the adjacent ranges of first AWG 1020 and second AWG 1040 in a primary or aliased range, then 156 FBGs may be read and resolved, in four groups of 39 FBG simultaneous sensor measurements at a time, each 39 measurements made by enabling a corresponding one of the four sources 1002-A through 1002-D.

Figure 11A:
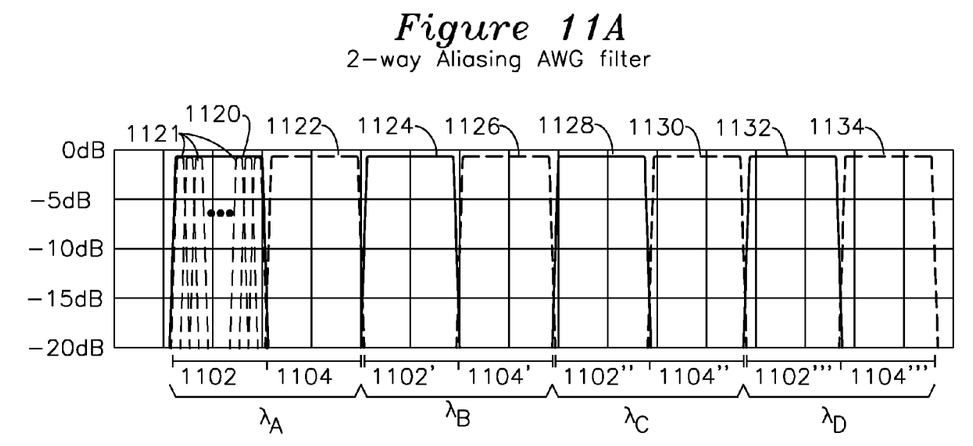
FIG. 11A is a simplified response plot of the AWG filters of FIG. 10.

FIG. 11A (which may be viewed in combination with FIG. 11B) shows a simplified wavelength plot for the interrogator of FIG. 10 for understanding the invention, where the adjacent AWG responses 1120 and 1122 (used with $\lambda A$), 1124 and 1126 (used with $\lambda B$), 1128 and 1130 (used with $\lambda C$), and lastly 1132 and 1134 (used with $\lambda D$) are shown in aggregate response for all channels of each AWG filter. The first AWG has a fundamental response 1120 (with individual AWG channel responses 1121 shown for reference), a first aliased response 1124, a second aliased response 1128, and a third aliased response 1132. The second AWG has a fundamental response 1122 which is adjacent to the first AWG fundamental response 1120. The second AWG also has a first aliased response 1126, a second aliased response 1130, and a third aliased response 1134.

Figure 11B:
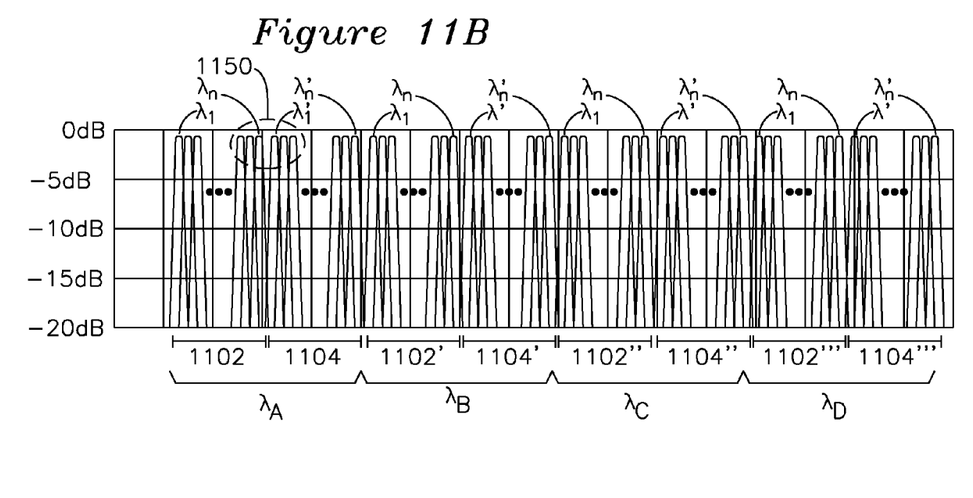
FIG. 11B is a response plot of the AWG filters of FIG. 11A showing the individual AWG channel responses.
Figures 11C, 11D:
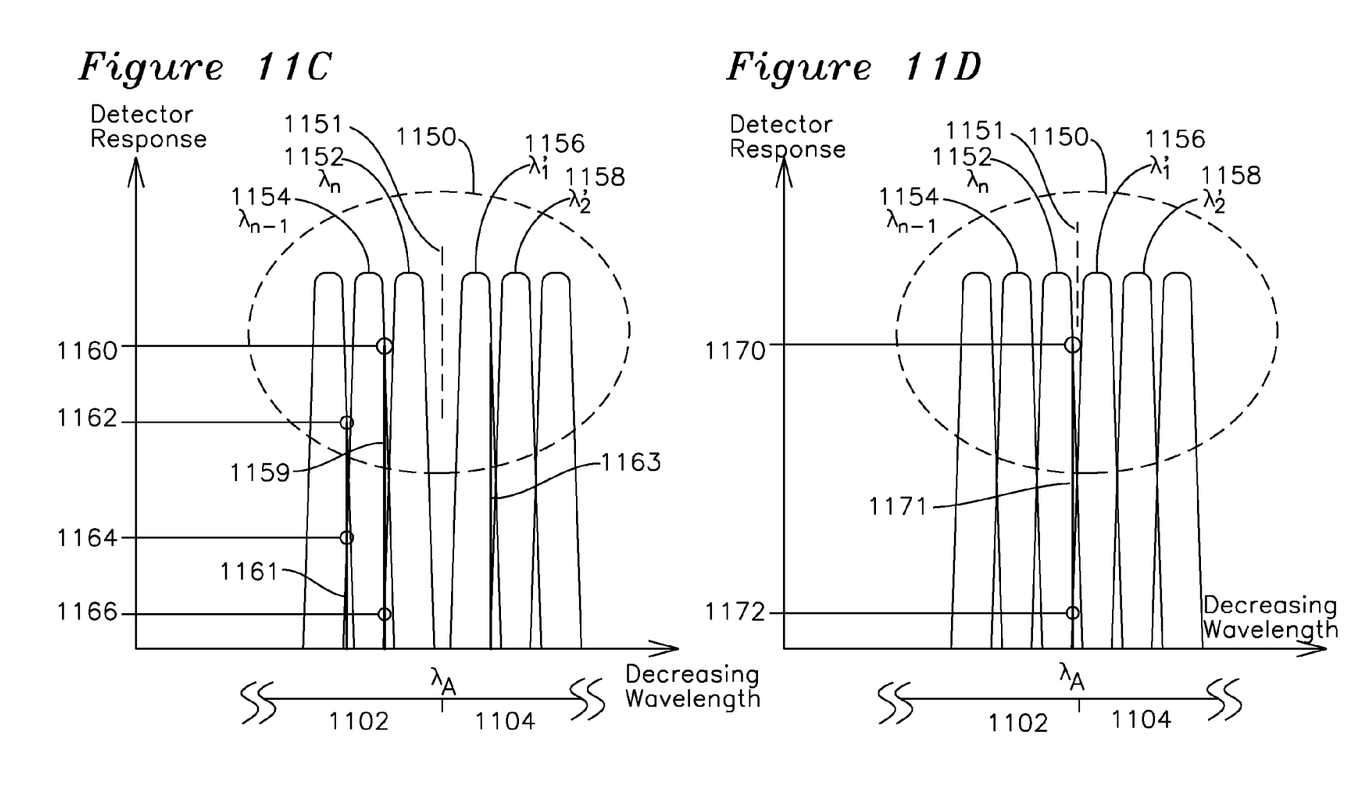
FIGS. 11C and 11D show detail plots of AWG filter response.

FIG. 11B shows the individual AWG wavelength optical outputs for a particular AWG, and also the associated range of each of the narrowband optical FBG sensor reflections generated by string 1006 of FIG. 10. The optical sources 1002-A through 1002-D of FIG. 10 generate output optical energy in wavelength ranges shown as $\lambda A$, $\lambda B$, $\lambda C$, and $2W$ of FIGS. 11A and 11B, which cover the range of a first AWG and second AWG in a fundamental or aliased response range, as shown. In this manner, when source 1002-A with associated wavelength $\lambda A$ is enabled, FBG sensors with responses in this wavelength range are simultaneously read using the fundamental response of the first AWG filter and second AWG filter. FIG. 11C shows a detailed region 1150 of FIG. 11B, including FBG reflected optical energy 1161 and 1159 which are within source $\lambda A$ range 1102, with the first AWG and second AWG response boundary indicated by reference marker 1151 between first AWG wavelength characteristics 1152 and 1154, and second AWG wavelength characteristics 1156 and 1158. The FBG with response 1161 reflects optical energy generating detector response amplitudes 1162 and 1164, which may be resolved to a particular associated FBG reflected wavelength. Similarly, the FBG with response 1159 reflects narrowband optical energy which is converted into a detector response 1160 and 1166, and resolved into a particular wavelength, and the FBG with narrowband response 1163 associated with the second AWG filter may be simultaneously read using the responses of adjacent AWG filter channels 1156 and 1158, as before. The other channels operate in a similar manner, where a particular optical source is enabled, and the response is read from either a fundamental or aliased response of the two AWG filters as a single unit. It is also possible to perform wavelength interrogation using the responses from adjacent AWG filters where the FBG narrowband reflection is at between the two AWG filters. For this case, the two AWG filter responses need to have overlap of the adjacent channel responses, as shown in detail FIG. 11D, where an FBG narrowband FBG reflected wavelength 1171 falls in the range of first AWG filter response 1152 and second AWG filter response 1156, providing response 1170 associated with a detector in a first AWG and response 1172 associated with a detector in the second AWG. An AWG of this construction with 40 channels on a first AWG and 40 channels on a second AWG, with a detector coupled to each AWG channel and the wavelength resolution performed using pairs of adjacent detectors, can thereby simultaneously resolve the wavelength of 79 FBGs, each of which is constrained to operate within the range of the two corresponding adjacent AWG channels.

Since the AWG responses canonically alias over the range of optical sources, the same procedure is used to read FBGs with reflected optical energy in the aliased AWG response as was done for the fundamental AWG response, which may be applied to FIGS. 11C and 11D for the alternate case where 1152 and 1154 are within a first, second, or third aliased response of the first AWG and 1156 and 1158 are within the corresponding first, second, or third aliased responses of the second AWG filter.

Accordingly, when source 1002-C which operates over a broadband range wavelength λC is enabled, FBG sensors 1068 are excited with optical energy, each FBG sensor in that group reflecting optical energy at its specific narrowband wavelength, all of which FBG sensors in group 1068 are simultaneously read using the first aliased response 1124 of the first AWG filter and first aliased response 1026 of the second AWG filter.

Figure 12:
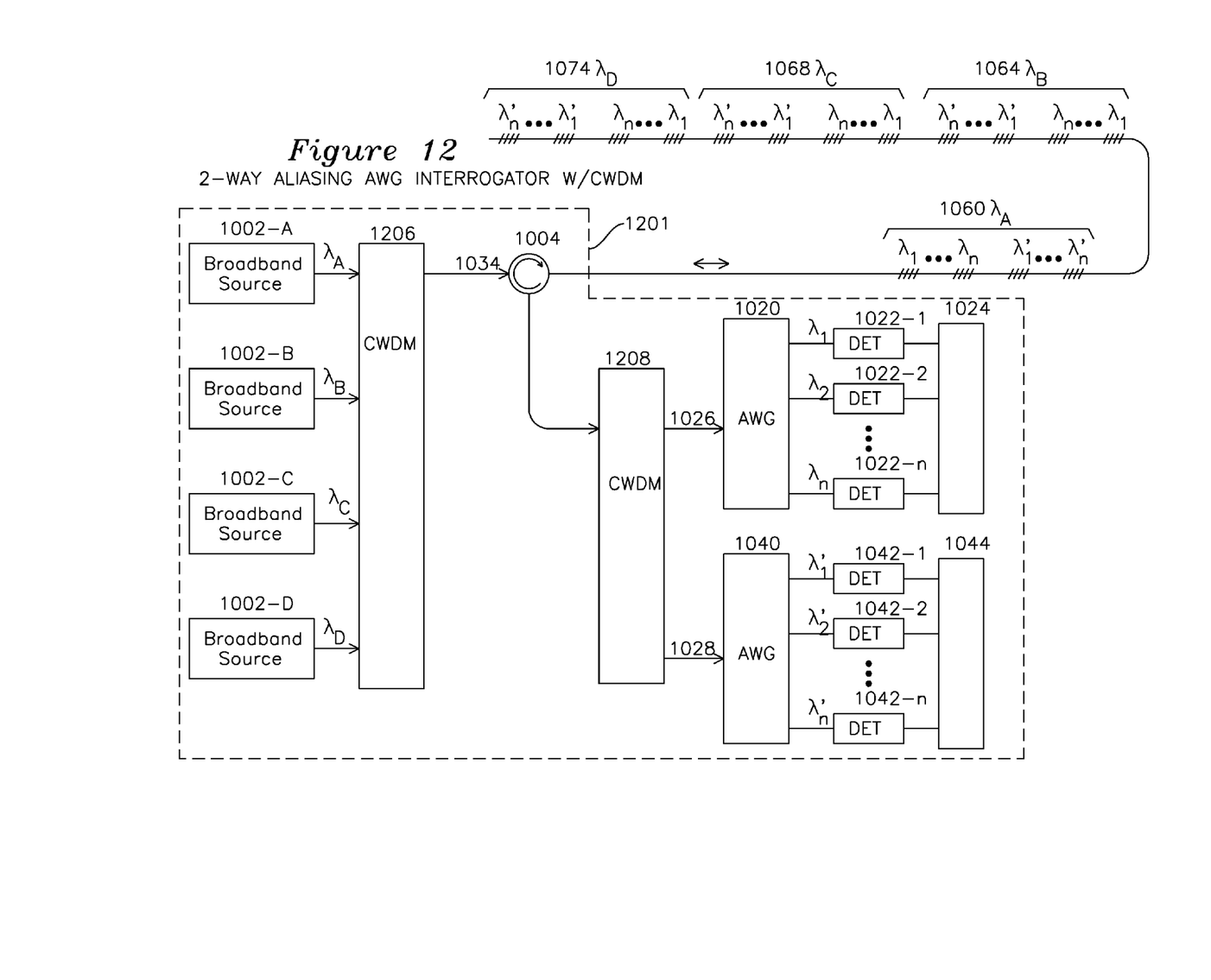
FIG. 12 is a block diagram of a 2-way AWG filter used with CWDM filters.

FIG. 12 shows the example of FIG. 10 and with the same reference numbers for identical elements, but with the optical combiners 1003-A, 1003-B, and 1003-C replaced by a Course Wavelength Division Multiplexing (CWDM) add drop multiplexer 1206. The CWDM 1206 typically has lower losses than the splitter combiners 1003-A through 1003-C of FIG. 10. Similarly, the splitter 1031 of FIG. 10 may be replaced by a 2-way CWDM filter 1208, which would have lower optical losses delivering reflected optical energy to the first AWG 1020 and second AWG 1040 than the splitter 1031 of FIG. 10.

In another example of the invention, a single AWG filter 1020 which has a sufficiently large number of channels is used, such that the aliased response of the lowest wavelength channel is adjacent to the fundamental response of the highest wavelength channel, such that there is no need for the second AWG 1040 and associated detectors 1031 and 1044. In this case, the single AWG 1020 provides aliased response which covers the desired optical spectrum in a continuous manner, with each optical source 1002-A, 1002-B, 1002-C and 1002-D covering each aliased spectrum of the AWG filter 1020. At present, it is less expensive to use multiple AWG filters in arrangements of two as is shown in FIGS. 10 and 12, but it is understood that the aliased response of a single AWG filter can alternatively be used when it becomes economically attractive to do so, or in the integrated optics embodiments described below.

Figure 13:
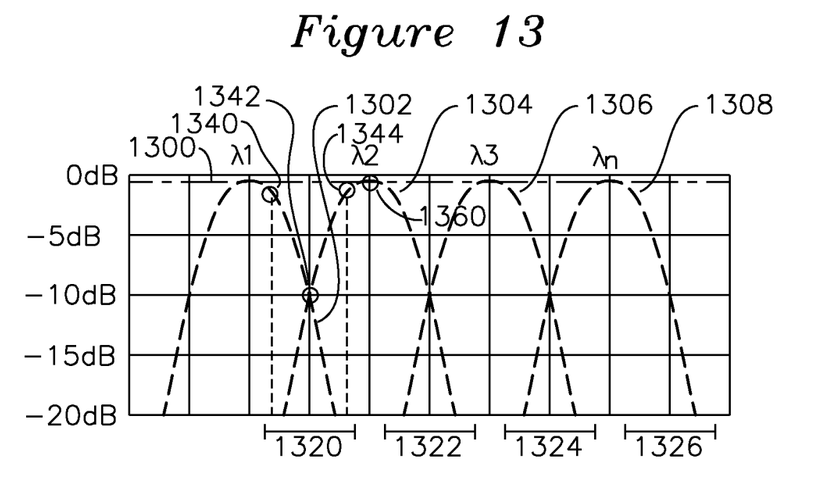
FIG. 13 is a plot of a non-overlapping AWG filter showing ranges of operation.

FIG. 13 shows plots for the individual channel responses of an AWG such as AWG A 1920 of FIG. 10 which resolves an applied wavelength using either a fundamental or aliased response, i.e., half the frequency separation between AWG channels of a single AWG as previously described. In this mode where AWG A 1020 and AWG B 1040 have adjacent, but non-overlapping responses, each channel response 1302, 1304, 1306, 1308 is associated with a particular AWG output. By examination of two adjacent AWG channel responses in range 1320, it is possible to resolve the two adjacent channel responses into a particular wavelength. For example, reading the responses of adjacent channels 1302 and 1304 for wavelength 1342 resolves the applied wavelengths within range 1320. Similarly, responses for 1340 and 1344 are resolvable to particular wavelengths using the method of comparison of adjacent channel responses. It can be seen that wavelength region 1320 provides optimum wavelength resolution. However, when the applied wavelength approaches a peak response of one of the AWG filters, the amplitude response flattens on the high amplitude channel, and the response becomes increasingly attenuated in the adjacent channel (such as below the −20 db limits of the plot), which reduces the resolution. For example, the wavelength resolution for an applied wavelength at point 1360 would be quite low. It is desired to provide increased wavelength resolution over a larger range of wavelengths.

Figure 14:
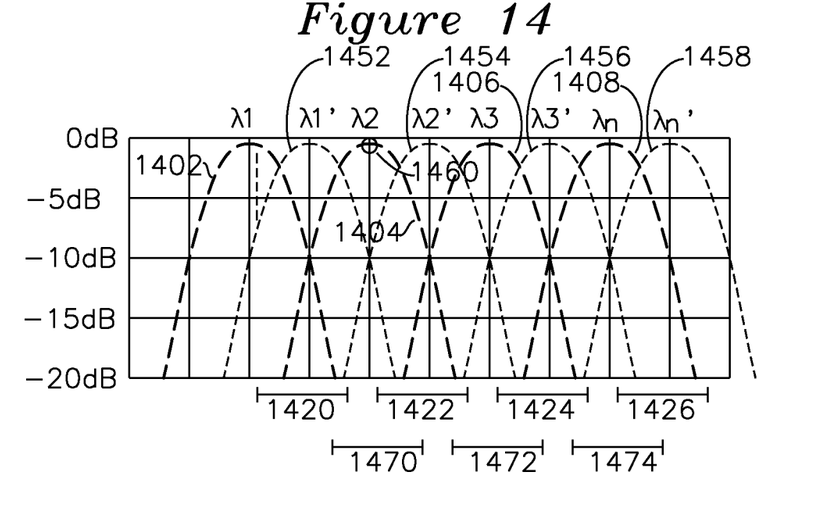
FIG. 14 is a plot of the wavelength responses of a second AWG filter offset from a first AWG filter of FIG. 13.

FIG. 14 shows the use of AWG A 1020 and AWG B 1040 with interleaved responses according to another aspect of the invention. In this embodiment, the AWG channel responses are offset by half a channel spacing, i.e., half the frequency separation between AWG channels of a single AWG. AWG A 1020 has channel responses 1402, 1404, 1406, and 1408. AWG B 1040 has channel responses 1452, 1454, 1456, and 1458. The greater coverage afforded by the interleaved AWG responses allows for continuous resolution of wavelength in bands 1420, 1422, 1424, and 1426, as well as 1470, 1472, and 1474. By selecting adjacent AWG responses using the interleaved channels, continuous resolution of wavelength over the entire wavelength range is possible. Wavelength 1460 which is not resolvable from AWG A 1020 channel 1404 may be now resolved using AWG B 1020 channels 1452 and 1454 associated detectors.

Additionally, it is possible to use responses from three adjacent channels to resolve a single wavelength, thereby improving resolution. In this manner, continuous resolution, improved resolution, or greater sensor wavelength range is possible.

Although the example of fundamental and three aliased AWG filter responses are shown in FIGS. 10 and 12, any other number of such aliased responses is possible in other embodiments of the invention. The number of optical sources shown in FIG. 10 as 1002-A to 1002-D is set to correspond to the number of aliased responses of the AWG filter 1020 and 1040 in use, however a larger number of optical sources may be used, for example individual optical sources for first AWG 1020 and each of its alias responses in use, and individual optical sources for second AWG 1020 and each of its alias responses in use. Other numbers and combinations of optical sources are also possible. The optical sources may be combined using a single optical combiner or multiple optical combiners. Similarly, the sensor string 1006 may be fabricated from a single fiber with FBG sensors arranged in sequence as shown in FIG. 10, or several strings of sensors may be combined, as long as each FBG sensor operates in a unique wavelength range from any other FBG sensor and has a corresponding optical source. The FBGs of the FBG sensor array may be arranged in any order of wavelength, and are shown as organized with broadband source wavelength groupings in FIGS. 10 and 12 for ease of understanding the invention.

A particular example of the invention for two AWGs may be provided by the case where the first AWG 1020 of FIG. 10 has 48 channels at 100 Ghz separation, or 0.8 nm separation at 1550 nm, and which has an aliasing response of 56 nm, such that λ1 of FIG. 11B is 1550 nm and λ1' is 1550 nm+56 nm=1606 nm. If 35 of the 48 channels (at 0.8 nm per channel) are used, then the first AWG would cover 28 nm, or from 1550 nm (shown as A-λ1 in FIG. 11B) to 1578 nm (A-λn in FIG. 11B). Then the second AWG 2040 of FIG. 10 could start with the first channel at 1578.8 nm and end with the 34th channel (with 0.8 nm channel separation) at 1605.2 nm. The first AWG filter first channel would then have a first alias response at 1606 nm. The interleaving of first and second AWG would thereby provide continuous coverage of the optical spectrum. Although the example is shown for the use of a subset of the number of channels for a stock AWG filter and not using channels on the upper range, it would be possible to utilize a custom AWG configured for this purpose, including a single AWG with an aliasing response that is non-overlapping to perform the function of the two AWG filters 1020 and 1040 shown in FIG. 10.

The invention may be practiced using individual fabricated optical components, or the wavelength interrogator may be fabricated using prior art integrated optic techniques onto a substrate. For example, in one example of the invention, the individual components of wavelength interrogator 1001 of FIG. 10 or wavelength interrogator 1201 of FIG. 12 may be fabricated using integrated optic methods. In one integrated optic embodiment, the optical elements are interconnected using optical waveguides fabricated using prior art Silicon on Insulator (SOI) fabrication methods, such as by forming the waveguides from patterned silicon (Si) waveguide cores fabricated over an insulating SiO2 (also known as Silica) cladding, which in turn is fabricated over a Silicon (Si) substrate. Alternatively, the waveguides may be formed using oxygen ion implantation below the surface of the silicon substrate using the prior art Separation by IMplanted Oxygen (SI-MOX) process. Another method for forming integrated optic components is the prior art Bond and Etch-back SOI (BE-SOI), where two wafers to be bonded have an oxidation applied to each surface, followed by bonding of the oxidized surfaces, which form the core of the waveguide, and subsequent thinning of one of the substrates, which forms the cladding of the waveguide. Another method is silicon epitaxial growth, where chemical vapor deposition (CVD) is used to form the waveguide core over the substrate, followed by photo etching and additional layers of CVD cladding to form the interconnecting waveguides. Using these integrated optics methods, the circulators 1004, AWG filters 1020, 1040, CWDM filter 1208, combiners 1003, and optical sources 1002 may be formed, such that the entire interrogator 1001 and 1201 are formed onto a single substrate for cost effectiveness and compact size. An optical adapter may be provided to couple to the sensor FBGs 1060, 1064, 1068, and 1074. Alternatively, the individual optical elements of interrogator 1001 and 1201 may be formed from discrete optical elements and interconnected using optical fiber.

We claim:

1. A wavelength discriminator having:
    a plurality of broadband optical sources coupled to an optical broadband source input port of a circulator, the circulator having a bidirectional sensor port coupling optical energy from the broadband optical sources to a plurality of fiber Bragg gratings (FBG) formed on an optical fiber;
    optical energy from said plurality of FBGs directed from said circulator sensor port to a measurement port coupled to a plurality of AWG filters;
    each said AWG filter accepting narrowband optical energy reflected from at least one said FBG and coupling said narrowband input optical energy to at least one AWG filter channel output, each said AWG filter operative in a fundamental range of wavelengths and also at least one alias of said fundamental range of wavelengths, each said respective channel output of each said AWG coupled to a detector;
    said plurality of FBGs including at least one FBG in said fundamental range and at least one said FBG in said alias range of said fundamental range;
    said wavelength discriminator converting said narrowband input optical energy into a wavelength estimate by examination of at least one said detector in combination with the wavelength range of a particular said broadband optical source which generated said narrowband input optical energy.

2. The wavelength discriminator of claim 1 where said plurality of AWG filters is two.

3. The wavelength discriminator of claim 1 where the number of said broadband optical sources is equal to the number of alias wavelengths of said AWG filter.

4. The wavelength discriminator of claim 1 where, for each said particular broadband optical source, each said FBG sensor generates a reflected wavelength generating a response in two adjacent AWG channels which are distinct adjacent AWG channels from any other two adjacent AWG channels.

5. The wavelength discriminator of claim 1 where said circulator couples reflected optical energy to said plurality of AWGs using an optical splitter.

6. The wavelength discriminator of claim 1 where said circulator couples reflected optical energy to said plurality of AWGs using a CWDM filter.

7. The wavelength discriminator of claim 1 where said broadband optical sources cover a range of wavelengths substantially equal to a range of wavelengths covered by said plurality of AWG filters.

8. The wavelength discriminator of claim 1 where said plurality of AWG filters have channels which have response wavelengths which are separated from each other by half of a frequency separation between AWG channels of a particular AWG.

9. The wavelength discriminator of claim 1 where said plurality of AWG filters includes at least a first AWG filter and a second AWG filter which have a fundamental response in non-overlapping wavelength ranges.

10. The wavelength discriminator of claim 1 where said plurality of AWG filters includes at least a first AWG filter and a second AWG filter which have a fundamental response in non-overlapping wavelength ranges.

11. A method operative on a controller for wavelength resolution of a narrowband optical signal presented to the input of a plurality of AWG filters, the controller coupled to:
    detector outputs of a plurality of AWG filters, each said AWG filter having a wavelength range, the wavelength range of at least one said AWG filter adjacent to the wavelength range of another said AWG filter;
    a plurality of optical sources, each said optical source operative over a range of wavelengths equal or less than the sum of fundamental wavelength range of the plurality of AWG filters, or the sum of an aliased wavelength range of the plurality of AWG filters;

a plurality of fiber Bragg gratings (FBG) reflecting optical energy from at least one of said plurality of optical sources and directing said reflected optical energy to said plurality of AWG filters;

the method of said controller comprising:

enabling one of said plurality of optical sources;

examining said plurality of detector outputs for the amplitude of a response to one or more said detectors;

computing a wavelength from said amplitude of a response to one or more said detectors in combination with the wavelength range of said optical source which was enabled to generate said reflected optical energy.

12. The method of claim 11 where said enabled optical source is operative in either a fundamental range of said plurality of AWGs, or an aliased range of said plurality of AWGs.

13. The method of claim 11 where the number of said AWG filters is two.

14. The method of claim 11 where at least one said FBG has an operating range which falls within the skirt response of two adjacent AWG filter channels.

15. The method of claim 11 where said plurality of AWGs have channel skirt responses which are adjacent to each other, thereby resolving a wavelength which is presented on the skirt response of two adjacent AWG filters.

16. The method of claim 11 where said optical energy is coupled to said circulator using a Coarse wavelength Division Multiplexing (CWDM) filter.

17. The method of claim 11 where said optical energy is coupled from said circulator to said plurality of AWG filters using a Coarse wavelength Division Multiplexing (CWDM) filter.

18. The method of claim 17 where said CWDM filter has an aliasing response which matches an aliasing response of an associated AWG filter.

19. The method of claim 11 where said plurality of AWG filters have channels which have response wavelengths which are separated from each other by half of a frequency separation between AWG channels of a particular AWG.

20. A wavelength discriminator for the measurement of optical wavelength from a plurality of Fiber Bragg Gratings (FBGs) formed on an optical fiber, the wavelength discriminator comprising:

a plurality of optical sources, each operative in a unique range of wavelengths;

a plurality of Array WaveGuide (AWG) filters, each having a plurality of optical channel outputs, each said optical channel output coupled to a detector;

each said optical source operative in either a fundamental wavelength range of said plurality of AWG filters or an aliased response of said AWG filter;

one of said plurality of optical sources coupling optical energy to said plurality of FBGs, a subset of said plurality of FBGs reflecting optical energy to said plurality of AWG filters, said plurality of detectors discriminating a wavelength for at least one said FBG of said subset of FBGs.

21. The wavelength discriminator of claim 20 where each of said optical sources is operative in a fundamental or aliased range of said plurality of AWG filters.

22. The wavelength discriminator of claim 20 where at least one of said optical sources has a bandwidth which is substantially equal to a fundamental or aliased range of said plurality of AWG filters.

23. The wavelength discriminator of claim 20 where each of said plurality of AWG filters has a wavelength range which is adjacent to other AWG filters.

* * * * *